United States Patent

Norman et al.

[11] Patent Number: 6,055,305
[45] Date of Patent: Apr. 25, 2000

[54] METHOD AND APPARATUS FOR PROVIDING NETWORK-BASED CUSTOMIZED CALL TREATMENT

[75] Inventors: Eric S. Norman; Peter M. Norman, both of Acworth, Ga.; Bruce D. Wycherley, Wanamassa, N.J.

[73] Assignee: AT&T Corp., New York, N.Y.

[21] Appl. No.: 08/991,154

[22] Filed: Dec. 16, 1997

[51] Int. Cl.[7] .................................................. H04M 3/42
[52] U.S. Cl. ........................ 379/210; 379/201; 379/243; 379/245
[58] Field of Search ............................... 379/67.1, 88.05, 379/88.06, 88.19, 198, 199, 196, 243, 245, 201, 210, 211

[56] References Cited

U.S. PATENT DOCUMENTS

| | | | |
|---|---|---|---|
| 4,941,167 | 7/1990 | Cannalte et al. | 379/67 |
| 4,996,704 | 2/1991 | Brunson | 379/67 |
| 5,222,125 | 6/1993 | Creswell et al. | 379/67 |
| 5,278,894 | 1/1994 | Shaw | 379/67 |
| 5,329,578 | 7/1994 | Brennan et al. | 379/67 |
| 5,384,831 | 1/1995 | Creswell et al. | 379/67 |
| 5,440,615 | 8/1995 | Caccuro et al. | 379/67.1 |
| 5,450,488 | 9/1995 | Pugaczewski et al. | 379/67 |
| 5,467,388 | 11/1995 | Redd, Jr. et al. | 379/196 |
| 5,481,594 | 1/1996 | Shen et al. | 379/67 |
| 5,487,111 | 1/1996 | Slusky | 379/211 |
| 5,544,229 | 8/1996 | Creswell et al. | 379/67.1 |
| 5,600,710 | 2/1997 | Weisser, Jr. et al. | 379/67 |
| 5,604,792 | 2/1997 | Solomon et al. | 379/67 |
| 5,684,872 | 11/1997 | Flockhart et al. | 379/266 |
| 5,737,701 | 4/1998 | Rosenthal et al. | 379/411 |
| 5,864,613 | 1/1999 | Flood | 379/188 |

*Primary Examiner*—Scott Wolinsky
*Assistant Examiner*—Bing Bui

[57] ABSTRACT

A method and apparatus for providing customized treatment for incoming calls from a calling party to a called party. A database is queried with a calling party identifier and a called party identifier of the calling party to obtain a call treatment parameter. When the call treatment parameter indicates the call requires treatment before being connected, treating the call without connecting the call to the called party, based on the call treatment parameter.

28 Claims, 8 Drawing Sheets

FIG. 3B

1 → FROM FIG. 3A

↓

DELIVER GENERIC "PARK" ANNOUNCEMENT — 320

↓

DROP CALL — 321

↓

END

FIG. 3C

2 → FROM FIG. 3A

↓

DELIVER ANNOUNCEMENT CORRESPONDING TO CALLING PARTY IDENTIFIER AND/OR CALLED PARTY IDENTIFIER — 330

↓

END

FIG. 3D

3 → FROM FIG. 3A

↓

PLAY ANNOUNCEMENT INDICATING CALL TO BE TRANSFERED TO ANOTHER DESTINATION — 340

↓

CUSTOM MESSAGE SERVICE ADJUNCT OUTDIALS DESTINATION IDENTIFIER — 341

↓

UPON CALL CONNECTION, CUSTOM MESSAGE SERVICE ADJUNCT RELEASES THE CALL TO THE TRANSIT NETWORK — 342

↓

UPDATE BILLING INFORMATION — 343

↓

END

FIG. 4

| SUBSCRIBER INFORMATION | CALLED PARTY IDENTIFIER | CALLING PARTY IDENTIFIER | CALL TREATMENT PARAMETER | MEMORY ADDRESS | TIME/DATE RESTRICTION | OCCURANCE METER | PIN | DESTINATION IDENTIFIER |
|---|---|---|---|---|---|---|---|---|
| WIDGETS, INC. | 800-555-1212 | 937-*-** | BRIDGE | 1A234 | 1200  7798 | | | 301-555-1111 |
| | | 301-555-**** | TRANSFER | 1B34D | | 100 | | 301-555-7777 |
| | | 703-555-1234 | PARK CALL | 2A550 | | | | |
| | 301-555-1111 | 301-555-2222 | PERSONAL MESSAGE | 417A5 | | | | |
| JOHN DOE | 202-555-7767 | 202-555-4331 | PERSONAL MESSAGE | 3724B | | | 1234 | |

400  410  420  430  440  450  460  470  480

METHOD AND APPARATUS FOR PROVIDING NETWORK-BASED CUSTOMIZED CALL TREATMENT

FIELD OF THE INVENTION

The present invention generally relates to communication services. More specifically, the present invention relates to providing network-based customized call treatment.

BACKGROUND

Known answering machines allow a called party to provide a pre-recorded message to a calling party after the call is connected and the phone has remained unanswered after a certain number of rings. The calling party can then leave a message for playback by the called party. These known answering machines, however, play the same pre-recorded message to every calling party regardless of whom called.

Some known messaging systems allow a called party to customize the message played to the calling party. For example, U.S. Pat. No. 4,996,704, issued to Brunson on Feb. 26, 1991 and assigned on its face to AT&T Bell Laboratories, is a known PBX-based system which allows the called party to customize the message to be played to the calling party. The called party can record multiple announcement messages each associated with at least one calling party. Upon receiving an incoming call, the automatic number identification (ANI) of the calling party is used to retrieve any associated customized message; that customized message is then played to the calling party.

These known messaging systems, however, do not have every feature that a called party may want. First, these known messaging systems are limited to use through a PBX and are only available to PBX customers; non-PBX consumers cannot use these known messaging systems.

Second, these known messaging systems require the call to be connected before the customized message can be provided to the calling party. The customized message can only be delivered after the called party's line has been rung and the called party has not answered, or after the called party's line has been rung and the line is busy.

Third, these known messaging systems are based on the called party's number at the PBX. These known messaging systems cannot address the situation where the called party has multiple telephone numbers; rather the called party separately has to customize messages for each telephone number.

Another known system allows a called party to customize the treatment of calls based on the identity of the calling party. U.S. Pat. No. 4,277,649, issued to Sheinbein on Jul. 7, 1981 and assigned on its face to Bell Telephone Laboratories, is a switched-based system integrated into the local switching office connecting the calling party to the interoffice trunk line. Every time the called party goes off-hook, the Sheinbein system is alerted and the called party is routed through the Sheinbein system. The called party can then enter special dual tone multi-frequency (DTMF) digits to enter customization instructions. While provisioning the Sheinbein system, the called party can hear announcements based on various half-second speech intervals. The called party can specify call treatment, such as call forwarding, based on a particular calling party's number.

The Sheinbein system, however, does not have every feature that a called party may want. First, this system unnecessarily requires every call by the called party and by any calling party to be routed through the system. This is a consequence of this system being integrated into the switching office. Second, this system cannot provide granularity to the treatment of calls. In other words, calls are analyzed at a top level where provisioning and treatment are performed on the basis of an entire called party number and an entire calling party number. Provisioning and treatment cannot be performed on a more detailed or complex basis. Finally, this system does not disclose providing any customized messaging to the calling party.

SUMMARY

The present invention can provide a calling party a customized call treatment before a call is sent to the called party. In other words, the appropriate call treatment can be provided to the calling party without wasting network resources to unnecessarily connect the call.

The present invention can provide the calling party customized call treatment passively. In other words, the calling party can receive the appropriate call treatment without necessarily providing any information, such as a personal identification number.

Customized call treatment is provided to incoming calls from a calling party to a subscriber (i.e., the called party). A database is queried with a calling party identifier and a called party identifier to obtain a call treatment parameter. When the call treatment parameter indicates the call requires treatment, before sending the call to the subscriber, the call is treated based on the call treatment parameter.

A database can be further queried with the calling party identifier and the called party identifier to obtain a message identifier. The message associated with the message identifier can be announced to the calling party. The message can be a customized message stored by the subscriber for the calling party.

In one embodiment, the call can be terminated without the call being connected to the subscriber, based on the call treatment parameter. In another embodiment, the call can be transferred to a destination associated with a destination identifier without the call being connected to the subscriber, based on the call treatment parameter.

In another embodiment, the calling party can be offered an additional communication service based on the call treatment parameter and the calling party identifier. For example, the additional communication service offered to the calling party can be an operator that can perform language translation, the language translation being based on the calling party identifier. Alternatively, the message announced can be in a selected language, the selected language being selected based on the calling party identifier.

The calling party identifier can be the automatic number identification (ANI) or the mobile identification number (MIN).

The subscriber can select the call treatment parameter associated with the calling party identifier and the called party identifier. The call treatment parameter can be associated with multiple calling party identifiers.

BRIEF DESCRIPTION OF THE DRAWINGS

FIGS. 3A through 3E provides a flow chart illustrating the manner in which calls are processed according to an embodiment of the present invention.

FIG. 4 illustrates the record layout for treatment database, according to an embodiment of the present invention.

DETAILED DESCRIPTION

Figure 1:
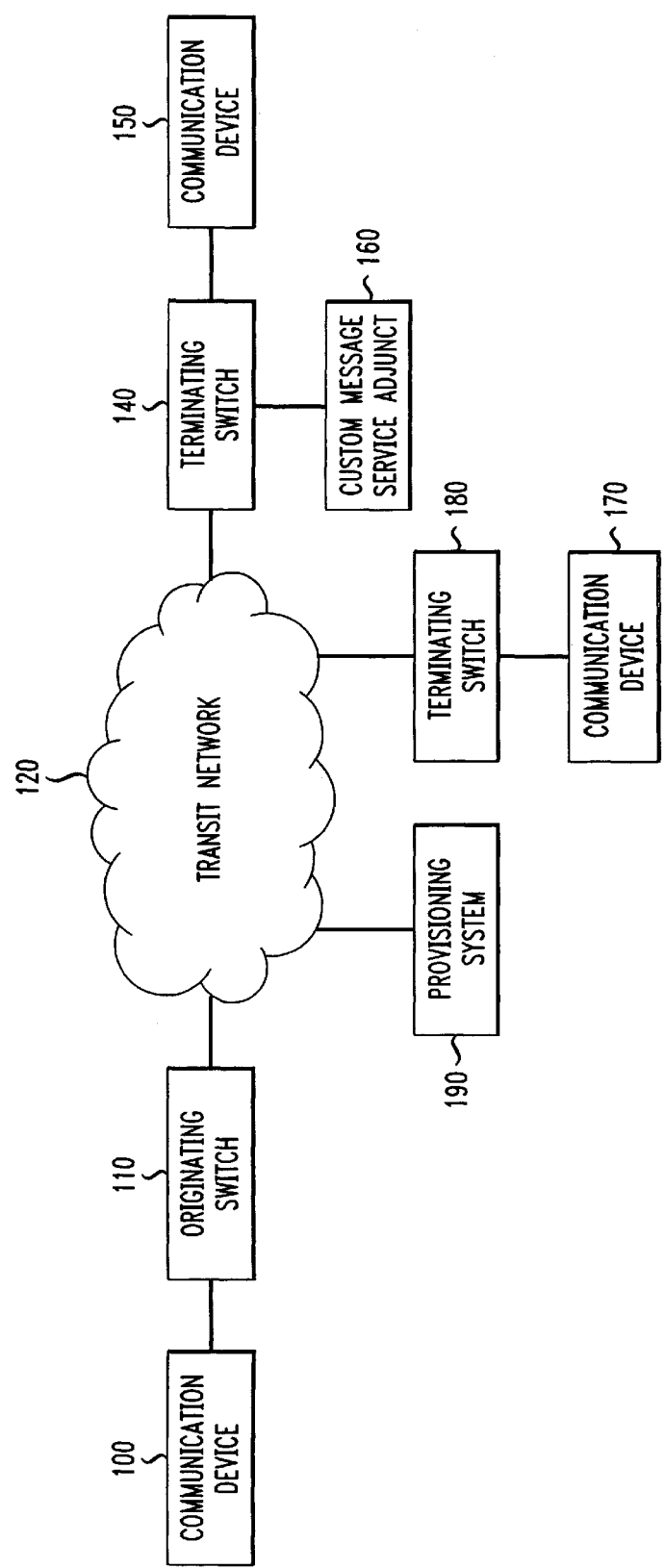
FIG. 1 illustrates a communications network according to an embodiment of the present invention.

FIG. 1 illustrates a communications network according to an embodiment of the present invention. Communication device 100 is connection to originating switch 110 which is in turn connected to transit network 120. Communication device 150 is connected to terminating switch 140 which is in turn connected to transit network 120. Custom message service adjunct 160 is connected to terminating switch 140. Communication device 170 is connected to terminating switch 180 which is in turn connected to transit network 120. Provisioning system 190 is connected to transit network 120.

Communication devices 100, 150 and 170 can be any of a variety of types such as a telephone, facsimile machine or a personal computer. Communication devices 100 and 150 or 170 transmit and receive information through originating switch 110, transit network 120, and terminating switches 140 or 180. The term "information" as used herein is intended to include data, text, voice, audio, video and/or multimedia.

Originating switch 110 and terminating switches 140 and 180 are switching centers that receive and deliver calls. In the example illustrated in FIG. 1, originating switch 110 receives calls from communication device 100; terminating switch 140 delivers that call to communication device 150. Originating switch 110 and terminating switches 140 and 180 each has a processor (not shown), computer readable memory (not shown), a data port (not shown), a network port (not shown) and a data bus (not shown). The data port can be connected to a communication device. The network port can be connected to transit network 120. The data bus connects the processor, the computer readable memory, the data port and the network port.

Originating switch 110 and terminating switches 140 and 180 operate special software to perform functions associated with toll calls and/or local calls. Originating switch 110 and/or terminating switches 140 and 180 can contain a dual tone modulated frequency (DTMF) detection unit to receive the DTMF signals. Alternatively, originating switch 110 and/or terminating switches 140 and 180 can contain a voice recognition unit to recognize voice responses. The AT&T 4ESS® switch and the Lucent Technologies 5ESS® switch are examples of the hardware that can perform the functions of originating switch 110 and terminating switches 140 and 180.

Note that while FIG. 1 merely shows one switch between a communication device and transit network 120, additional switches can be present as well. In other words, although transit network 120 only shows originating switching 110 and terminating switches 140 and 180 connected, any number of additional switches in fact may be connected to transit network 120. Transit network 120 can be of any type including, for example, the public switched telephone network (PSTN) international networks, the Internet or any combination of networks. For example, in the case where originating switch 110 and terminating switches 140 and 180 are central offices of local exchange carriers (LECs), transit network 120 can be the AT&T interexchange carrier (IXC) network. Alternatively, in the case where originating switch 110 and terminating switches 140 and 180 are IXC switches, switches 110, 140 and 180 in addition to transit network 120 can comprise the AT&T IXC network; although not shown, central office switches can connect switches 110, 140 and 180 to communication devices 100, 150 and 170, respectively.

Although FIG. 1 only shows communication device 100 connected to originating switch 110 and communication devices 150 and 170 connected to terminating switches 140 and 180, respectively, any nubber of additional communication devices may be connected to originating switch 110 or terminating switches 140 and 180.

Provisioning system 190 is an adjunct platform which collects custom messaging information from the subscriber of the custom message service, as described below in connection with FIGS. 5A and 5B. For example, a subscriber can provide provisioning system 190 messages and calling party identifier(s) and/or called party identifier(s) associated with the messages. Provisioning system 190 can then relay these messages and their associated calling party identifier(s) and/or called party identifier(s) to custom message service adjunct 160 for storage. Note that the term "subscriber" refers herein to a prospective called party who has subscribed to the custom message service described herein.

Provisioning system 190 can be accessed by the subscriber through a service identifier (e.g., a 1-800 number) different than the service identifier associated with custom message service adjunct 160. Provisioning system 190 can be, for example, the AT&T Conversant system which allows the subscriber to select custom messaging information, at least in part, through DTMF menus. In an alternative embodiments, provisioning system 190 can be connected to terminating switches 140 and/or 180, and/or can be connected within custom message service adjunct 160.

Figure 2:
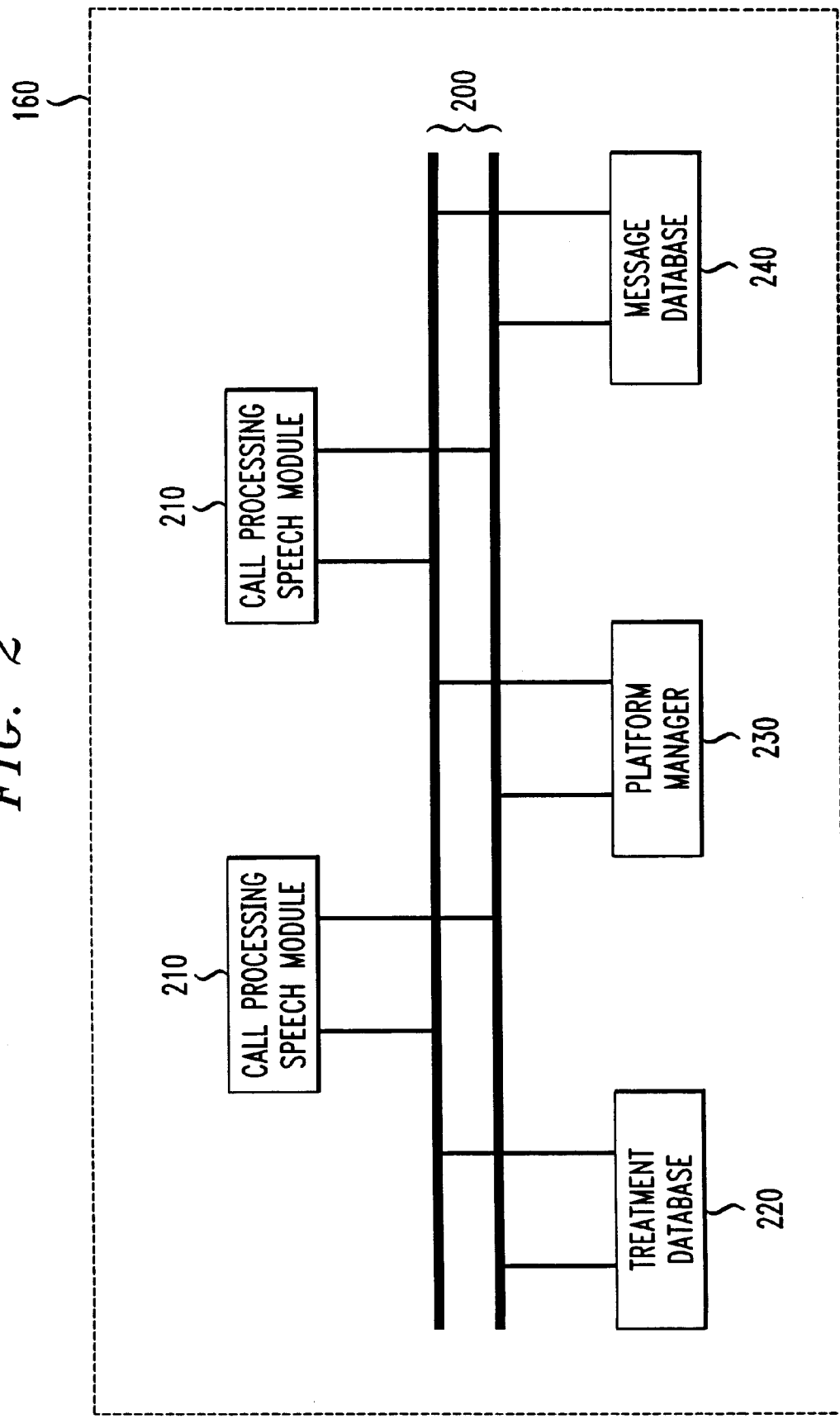
FIG. 2 shows a system block diagram of custom message service adjunct according to an embodiment of the present invention.
Figure 3A:
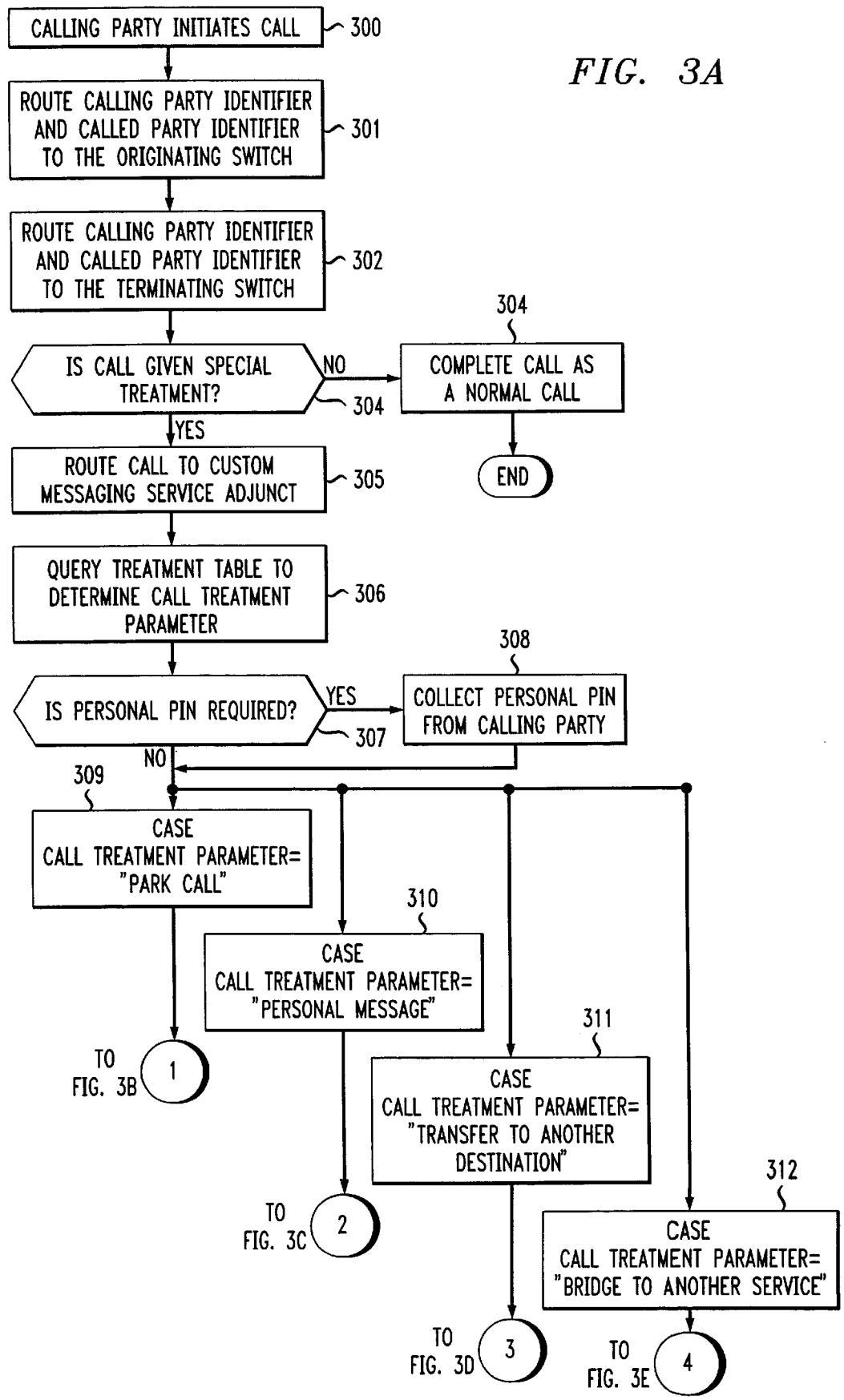
Figure 3E:
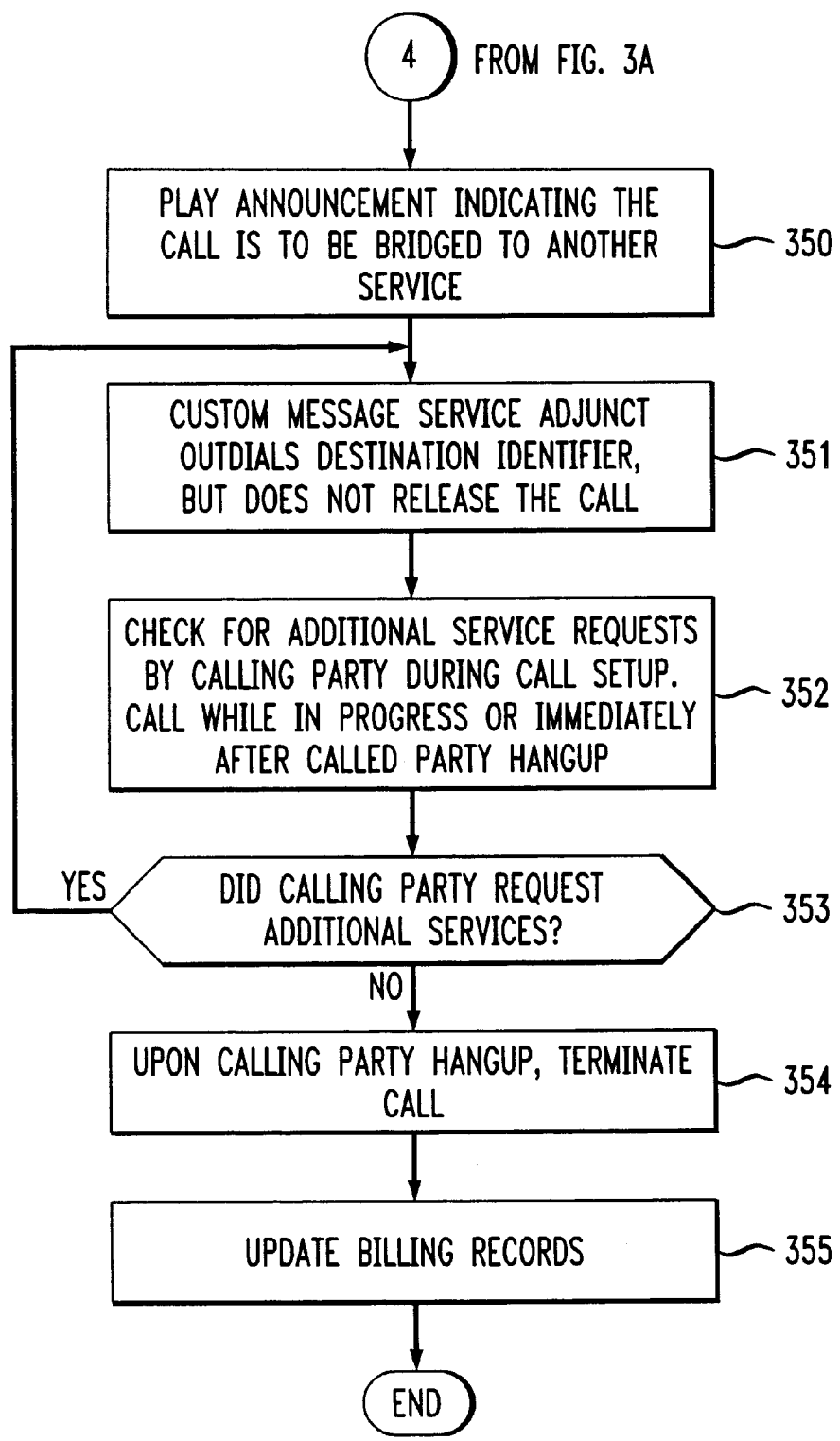

FIG. 2 shows a system block diagram of custom message service adjunct according to an embodiment of the present invention. Custom message service adjunct 160 comprises dual local-area network (LAN) 200 which interconnects call processing speech modules 210, treatment database 220, platform manager 230 and message database 240. In an alternative embodiment where provisioning system 190 is located within custom message service adjunct 160, LAN 200 can connect to provisioning system 190.

Call processing speech modules 210 can be specialized circuitry or computer processors operating specialized software to process calls. Call processing speech modules 210 can be, for example, the AT&T Conversant system. Call processing speech modules 210 can have trunks that are connected to terminating switch 140 and can use the commercial primary rate interface (PRI) version of Integrated Services Digital Network (ISDN).

Platform manager 230 is a computer processing system that performs operations, administration and maintenance (OAM) activities associated with custom message service adjunct 160. For example, platform manager 230 can take measurements on custom message service adjunct 160 and provide those measurement results to the proper system within transit network 120. Additionally, for example, platform manager 230 can manage billing information and alarms associated with custom message service adjunct 160.

Message database 240 is a data storage device that stores messages which can be retrieved for playback to calling parties. Treatment database 220 contains customer records that can be queried. Alternatively, message database 240 and/or treatment database 220 can be embodied by a database server, separate from custom message service adjunct 160, that can receive database queries from terminating switch 140 using the SS7 (Signaling System 7) protocol or the TCP/IP protocol (transmission control protocol/Internet protocol).

FIGS. 3A through 3E provide a flow chart illustrating the manner in which calls are processed according to an embodiment of the present invention. Note that in the process described in FIGS. 3A through 3E, the called party is a subscriber of the customized announcement message service; the called party has previously set up its customized messages (see FIGS. 5A and 5B below) before a call is placed by the calling party.

The process begins at step 300, where the calling party initiates a call. At step 301, the call is received at originating switch 110. Originating switch 110 receives the calling party identifier and the called party identifier. In step 302, the calling party identifier and called party identifier are routed to terminating switch 140 through transit network 120.

At conditional step 303, terminating switch 140 queries a database (not shown) to determine whether the call is given special treatment. The database can be located at terminating switch 140 or located remotely from terminating switch 140. The query received by the database includes the calling party identifier and the called party identifier. In an embodiment where the database is located remotely from terminating switch 140, terminating switch 140 communicates with the database by any number of protocols including the SS7 protocol.

FIG. 4 illustrates the record layout for treatment database, according to an embodiment of the present invention. The record layout for treatment database 220 (shown in FIG. 2) of custom message service adjunct 160 comprises the following components: subscriber identification 400, called party identifier 410, calling party identifier 420, call treatment parameter 430, memory address 440, time/date restriction 450, occurrence meter 460, personal PIN 470 and destination identifier 480.

Subscriber identification 400 is the field in treatment database 220 that contains the identification of the subscriber. The identification of the subscriber can be, for example, in alphanumeric form thereby identifying the subscriber's name.

Called party identifier 410 is the field in treatment database 220 that contains the identifiers associated with a given subscriber as a called party. The called party identifiers can be, for example, in the form of a telephone number, an e-mail address, or a Uniform Resource Locator (URL)) address associated with, for example, the Internet. Note multiple identifiers can be associated with a given subscriber. Note also that the database records shown in FIG. 4 are organized with respect to the subscriber rather than with respect to the called party's identifier. This configuration allows a given subscriber to customize messages for multiple identifiers associated with that single subscriber.

Calling party identifier 420 is the field in treatment database 220 that contains the identifiers associated with potential calling parties. The calling party identifiers can be, for example, in the form of a telephone number, an e-mail address, or a URL address. Note that the values in calling party identifier 420 can have wild card values associated in various fields of the identifier. Specifically, a wild card value can be embodied by an asterisk ("*"). The wild card values can be in the area code field of the called party's identifier, the exchange field of the calling party's identifier, or in any of the final four digits of the calling party's identifier. Of course, this example relates to embodiments where the identifier is a telephone number; the wild card can be applied to other embodiments where the identifier is something other than a telephone number, such as an e-mail address or a URL address.

Call treatment parameter 430 is the field in treatment database 220 that contains a value which indicates how the call is to be treated. Specifically, the call treatment parameter 430 can have the values of "personal message," "park call," "transfer to another destination," and "bridge to another service." Each of these particular call treatments will be addressed below in connection with FIGS. 3A through 3E.

Memory address 440 is the field in treatment database 220 that contains the memory address in message database 240 for the customized message associated with a particular called party identifier 410 and calling party identifier 420. In other words, for a calling party identifier and called party identifier that match the particular values in called party identifier 410 and calling party identifier 420, the customized message located in memory address shown in memory address 440 is retrieved.

Certain parameters within treatment database 220 are variable treatment parameters which allow the treatment of calls to vary over time without the subscriber necessarily modifying the values of the parameters. For example, time/date restrictions 450 and occurrence meter 460 are variable treatment parameters.

Time/date restriction 450 is the field in treatment database 220 that contains values restricting the time and date of when the customized message will be retrieved. For example, for a time/date restriction of 1200 7798, in field time/date restriction 450, a customized message will be retrieved only for dates and times before noon on Jul. 7, 1998.

Occurrence meter 460 is the field in treatment database 220 that contains a numerical value which indicates how many more times the customized messages should be played. For example, a business subscriber can decide to play, for only the first 100 callers, a customized message that informs the calling party of a discount associated with that business. Each time the customized message associated with a given calling party identifier and a given called party identifier is played, the value in occurrence meter 460 is decremented. The customized message will only be played to the calling party while occurrence meter 460 has a positive value.

PIN (personal identification number) 470 is the field in treatment database 220 that contains a personalized identification number selected by the subscriber and provided to the calling party. In other words, the subscriber can select a PIN for specific individual calling parties to access the appropriate customized message. A calling party can enter the value in PIN 470 to access the customized message associated with that particular called party identifier and calling party identifier.

Note that the PIN is not normally required and can be added by a subscriber in the rare case where multiple potential message recipients share the same calling party identifier, such as roommates or dormmates. In such a case, the subscriber can use the PIN to further select who receives a particular message. Where potential message recipients do not share the same calling party identifier, no need exists for a PIN and the calling party would receive the appropriate custom message passively without providing any information to the custom message service.

A subscriber could select a value for PIN 470 where multiple persons have access to the same calling party's identifier. For example, to address the situation where an apartment has multiple persons sharing the same phone line, a subscriber can select in a value for PIN 470 and provide that value for PIN 470 to only one of those persons sharing the phone line. Consequently, when someone calls the subscriber from that calling party identifier, only the person with prior knowledge of the PIN value access the customized message.

Destination identifier 480 is the field in treatment database 220 that contains the identifier associated with the destination to which the call is to be rerouted. For example, when call treatment parameter 430 has a value of "transfer to another destination," the call is transferred to the identifier in destination identifier 480. The destination identifiers in destination identifier 480 can be, for example, in the form of a telephone number, an e-mail address, or a URL address.

Returning to FIG. 3A, at conditional step 303, if the call is not to be given special treatment, then the process proceeds to step 304. At step 304, the call is completed as a normal call and the process ends.

At conditional step 303, if the call is to be given special treatment, then the process proceeds to step 305. At step 305, the call is routed to custom messaging service adjunct 160. At step 306, treatment table 220 is queried to determine the value of call treatment parameter 430 for the calling party identifier and the called party identifier.

At conditional step 307, custom message service adjunct 160 determines whether the calling party is required by the subscriber to enter a PIN. Note that normally, the subscriber need not require the calling party to enter a PIN. The subscriber has required the calling party to enter a PIN when PIN 470 has a value for the calling party identifier and called party identifier. If a PIN is required, then the process proceeds to step 308 where the custom message service adjunct 160 collects a PIN from the calling party. The process then proceeds to multiple case steps 309, 310, 311, and 312. If a personal PIN is not required, then the process proceeds directly to multiple case steps 309 through 312.

At case step 309, if the call treatment parameter 430 has a value of "park call," then the process proceeds to step 320, shown on FIG. 3B. At step 320, custom message service adjunct 160 delivers a generic "park" announcement. The generic "park" announcement, for example, can be "your call will not be connected to the identifier you dialed." Note that step 320 is optional and need not be performed in all situations. At step 321, the call is dropped or terminated and the process then ends.

At case step 310, if call treatment parameter 430 has a value of "personal message," then the process proceeds to step 330, shown on FIG. 3C. At step 330, custom message service adjunct 160 delivers the previously recorded message that corresponds to the calling party identifier and called party identifier. The process then ends.

At case statement 311, if the call treatment parameter is "transferred to another destination," then the process proceeds to step 340, shown on FIG. 3D. At step 340, custom message service adjunct 160 plays to the calling party an announcement indicating that the call is to be transferred to another destination. For example, the announcement can be, for example, "your call is being transferred to another identifier as previously selected by the called party." Note that step 340 is optional and need not be performed in all situations.

At step 341, the custom message service adjunct 160 out dials the destination identifier in destination identifier 480 associated with the calling party identifier and called party identifier. At step 342, upon call connection, custom message service adjunct 160 releases the call to transit network 120. At step 343, the billing information is updated and the process then ends.

The routing of a call where the call treatment parameter is "transferred to another destination" can be described in reference to FIG. 1. In FIG. 1, communication device 100 originally can call communication device 150. In the case where the call treatment parameter is "transferred to another destination," the destination identifier can be, for example, the identifier associated with communication device 170. In such a case, custom message service adjunct 160 would out dial the identifier associated with a communication device 170 and upon completion of the call through terminating switch 180, the original call between communication device 100 and communication device 150 would be terminated.

At case statement 312, if the call treatment parameter is "bridged to another service," the process proceeds to step 350. At step 350, custom message service adjunct 160 can play to the calling party an announcement indicating that the call was to be bridged to another service. The announcement can be, for example, "your call is being bridged to another service as previously selected by the called party." For example, the other service being bridged can be another messaging service where the calling party can record a message for the called party. Note that step 350 is an optional step that need not be performed in all situations.

At step 351, custom message service adjunct 160 out dials the destination identifier associated with that other service but does not release the call. The other service to which the call is bridged can be any of type including operator-provided language translation. The particular language chosen for translation can be selected based on the calling party identifier. For example, if the calling party identifier has an area and exchange that is associated with a particular neighborhood predominately having residents that speak a language other than that spoken at by subscriber, then operator-provided language translation can be provided in that second language.

At step 352, custom message service adjunct 160 checks for additional service requests by the calling party during call setup while the call is in progress or immediately after the called party hangs up. For example, custom message service adjunct 160 can check for DTMF signals from the calling party to force a disconnect for the current call similar to the AT&T Voice Line service; in other words, the calling party can send DTMF signals to terminate the current connection between transit network 120 and the forwarded called party.

At conditional step 353, the custom message service adjunct 160 determines whether the calling party in fact did request additional services. If the calling party did request additional services, the process returns back to step 351, for additional processing in connection to the other service. If the calling party did not request additional services, the process proceeds to step 354. At step 354, upon the calling party hanging up, the call is terminated. At step 355, the billing records associated with the call are updated, and the process ends.

Note that the information obtained by terminating switch 140 and forwarded to custom message service adjunct 160 includes but is not limited to the following: the automatic number identification ("ANI"), the called party identifier, the mobile identifier number ("MIN"), and perhaps additional information associated with a calling card. Custom message service adjunct 160, upon receiving this information, can distinguish between various types of calling parties and provide different call treatment upon that information. For example, custom message service adjunct 160 can distinguish an ANI from a MIN to determine whether the calling party is calling from a mobile cellular phone or calling from a dedicated line. In the case where the calling party is a cellular phone user and the MIN is forwarded to custom message service adjunct 160, custom message service adjunct 160 can provide treatment to the call specific to cellular phone users such as speech activated dialing rather than dual tone modulated frequency ("DTMF") dialing and option selections.

Figure 5A:
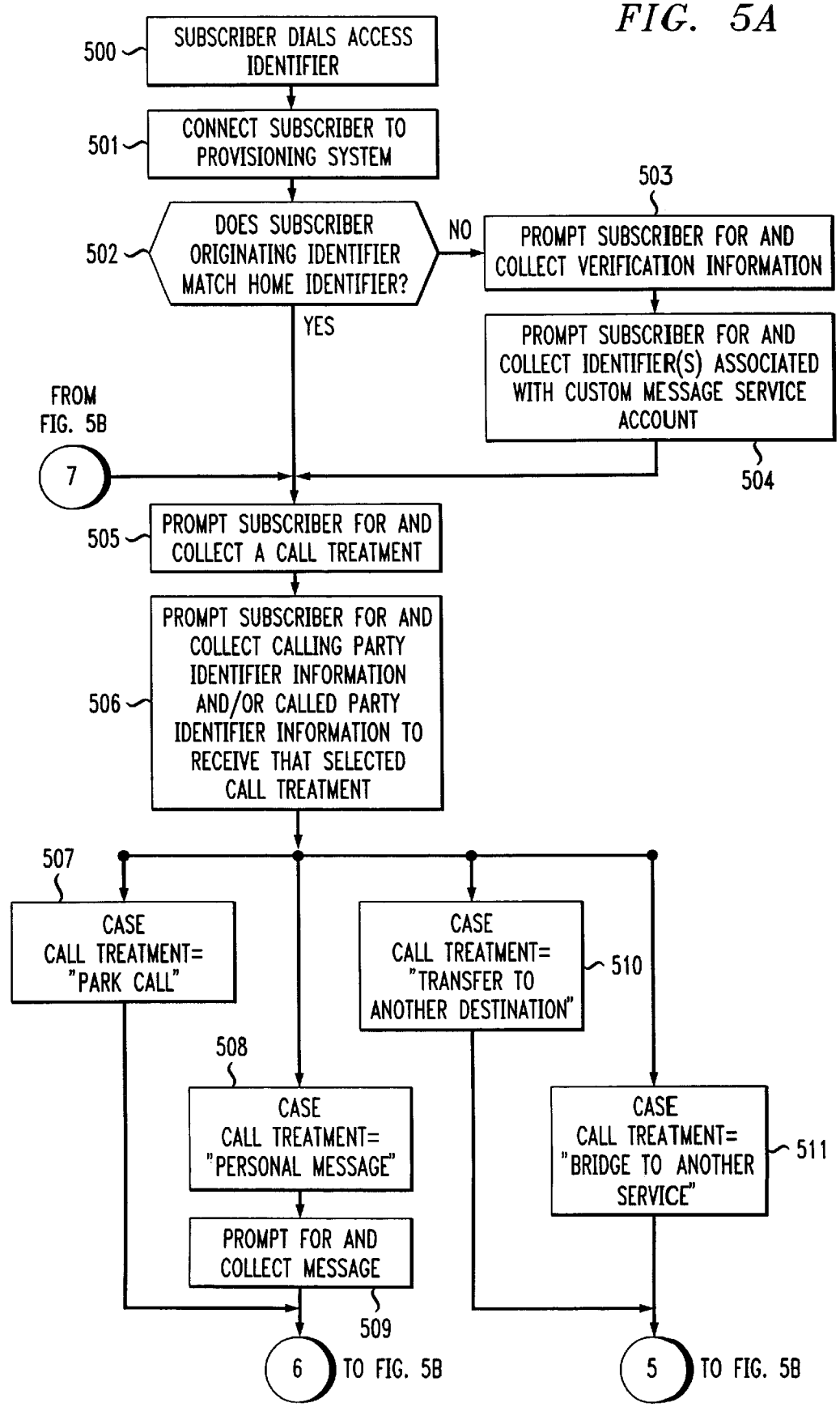
FIGS. 5A and 5B provides a flow chart illustrating the manner in which a subscriber customizes messages to be delivered to various calling parties, according to an embodiment of the present invention.
Figure 5B:
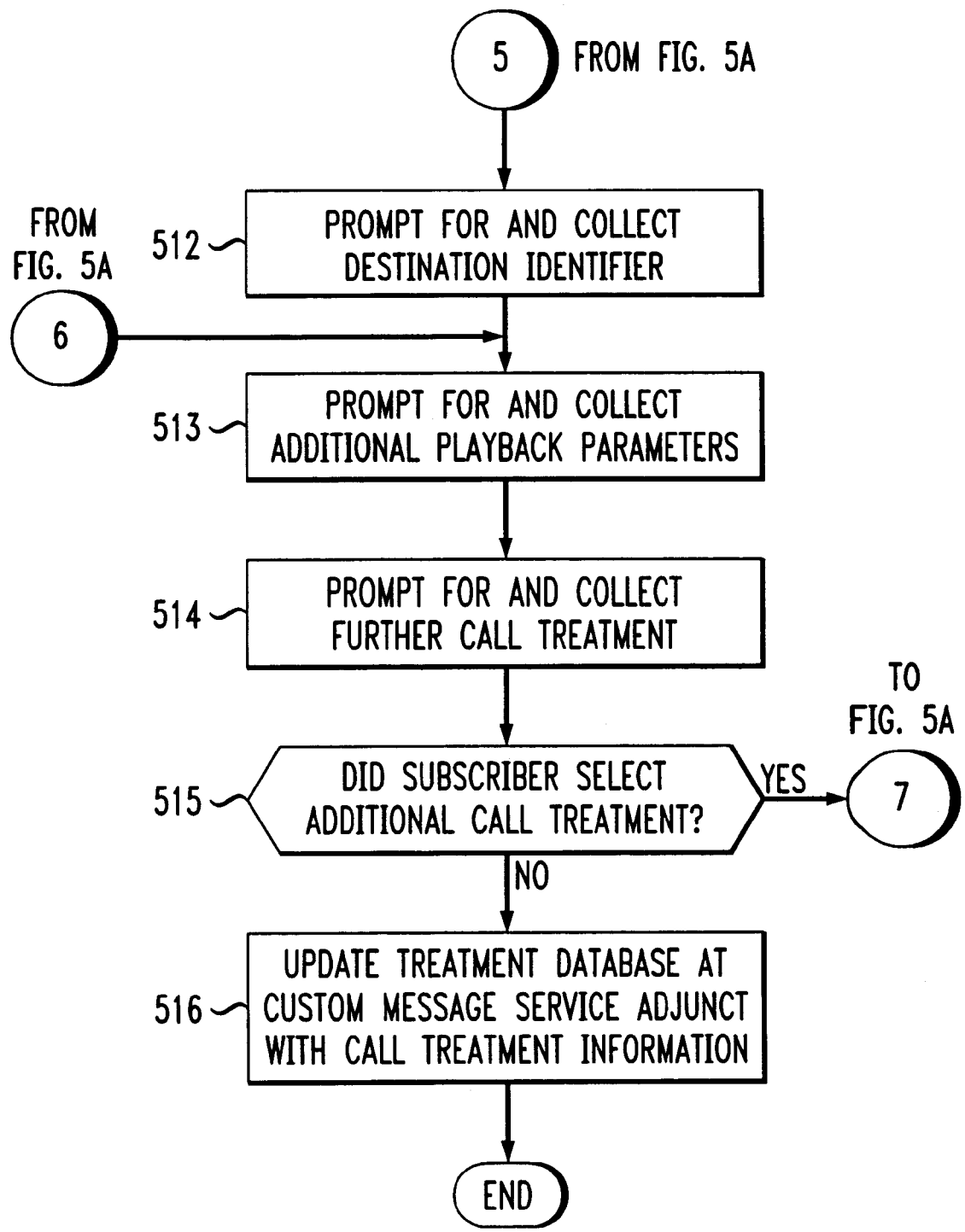

FIGS. 5A and 5B provides a flow chart illustrating the manner in which a subscriber customizes messages to be delivered to various calling parties, according to an embodiment of the present invention. The subscriber can set up outgoing customized messages for expected calling parties. Additionally, the subscriber can perform maintenance-type functions without setting up outgoing customized messages for expected calling parties. For example, the subscriber can record/store standard messages, change message durations, alter occurrence meter values, alter time/day restrictions, delete previous messages, change call transferring options and change call bridging options.

At step 500, the subscriber dials an access identifier associated with the custom message service. At step 501, the subscriber is connected to provisioning system 190.

At conditional step 502, provisioning system 190 determines whether the subscriber's originating identifier matches the subscriber's home identifier which is known beforehand to provisioning system 190. If the subscriber's originating identifier does not match the subscriber's home identifier, then the process proceeds to step 503.

At step 503, provisioning system 190 prompts the subscriber for and collects verification information. For example, a PIN number associated with the subscriber can be obtained to verify that the caller is a subscriber and has access to the custom message service. Verification information can include, for example, a password, the subscriber's mother's middle name or some similar type of personal identification number. Provisioning system 190 recognizes the appropriate account information and thereby verifies the subscriber's identity.

At step 504, provisioning system 190 prompts the subscriber for an identifier or identifiers associated with the custom message service account. For example, a given subscriber may have only a single identifier or may have multiple identifiers which can be associated with customized messages. A subscriber in the process to be described below, can then customize messages for one identifier, all identifiers or a subset of multiple identifiers associated with that particular subscriber.

Returning to conditional step 502, if the subscriber's originating identifier matches the subscriber's home identifier, then the process proceeds to step 505.

At step 505, provisioning system 190 prompts a subscriber for and collects a call treatment to be applied. The possible call treatments include the "personal message," "park call," "transferred to another destination" and "bridged to another service."

At step 506, provisioning system 190 prompts a subscriber for and collects calling party identifier information and/or called party identifier information to receive the selected call treatment. In other words, the subscriber can select the calling party identifier(s) or segments of the calling party identifier(s) to receive the call treatment in many formats; the subscriber can also select to which called party identifier(s), if the subscriber has multiple called party identifiers, the call treatment will apply.

For example, the subscriber can select just the area code in which case the call treatment will be applied to all calling party identifiers with this particular area code. Alternatively, the subscriber can select a particular area code and/or exchange to which the call treatment will be applied. Alternatively, the subscriber can also select a specific calling party identifier for which the specific call treatment will apply. Finally, the subscriber can also select a wild card such as an asterisk for which the call treatment will apply to all calling party identifiers, unless overridden by some subsequent selection.

Similarly, the subscriber having multiple called party identifiers can make the same type of selections regarding called party identifier(s). For example, a subscriber having multiple called party identifiers can select that a particular call treatment, message and calling party identifier be applied to all of the subscriber's called party identifiers.

At case statement 507, if the call treatment selected by the subscriber is "park call," then the process proceeds to step 513 and will be discussed below.

At case step 508, if the call treatment selected by the subscriber is "personal message," then the process proceeds to step 509. At step 509, provisioning system 190 prompts the subscriber for and collects the customized message associated with a calling party identifier and a called party identifier. The process then proceeds to step 513.

At case statement 510, if the call treatment selected by the subscriber is "transferred to another destination," then the process proceeds to step 512.

At case statement 511, if the call treatment selected by the subscriber is "bridged to another service," then the process proceeds to step 512.

At step 512 shown in FIG. 5B, provisioning system 190 prompts the subscriber for and collects a destination identifier. For example, where the user has selected the call treatment of "transfer to another destination," the destination identifier collected in step 512 is associated with the destination to which the call will be transferred when a future calling party identifier and called party identifier matches the called party identifier and calling party identifier. Similarly, if the subscriber has selected the call treatment of "bridge to another service" then the destination identifier collected in step 512 is associated with the destination to which the call will be bridged when a future calling party identifier and called party identifier matches the called party identifier and calling party identifier.

At step 513, provisioning system 190 prompts a subscriber for and collects additional playback parameters. These additional playback parameters can include, but are not limited to, time/date restrictions associated with a customized message, an occurrence meter determining the number of times that the customized message is to be played, and/or a PIN number for which a calling party enters to obtain the customized message.

At step 514, provisioning system 190 prompts a subscriber for and collects further call treatment(s) to be associated with another calling party identifier and called party identifier pair.

At conditional step 515, provisioning system 190 determines whether the subscriber did in fact select additional call treatment. If the subscriber has indicated that additional call treatment is to be processed, then the process proceeds to step 505, where provisioning system 190 can collect an additional calling party identifier and called party identifier as well as the additional call treatment information. If the subscriber does not want to select additional call treatments, then the process continues to step 516.

At step 516, treatment database 220 at custom message service adjunct 160 is updated with the call and call treatment information collected in steps 505 through 513. The process then ends.

It should, of course, be understood that while the present invention has been described in reference to a particular system configuration and process, other system configurations and processes should be apparent to those of ordinary skill in the art. For example, embodiments of the present invention can include any number of communication devices, originating switches, terminating switches, and be connected to a communication network or combination of communication networks.

What is claimed is:

1. A method for providing customized treatment to incoming calls from a calling party to a called party, comprising:
   (a) querying a database with a first calling party identifier and a first called party identifier to obtain a call treatment parameter and a variable treatment parameter, the variable treatment parameter including an occurrence restriction; and
   (b) treating the call, when the call treatment parameter and the variable treatment parameter indicates the call requires treatment, without connecting the call to the called party, based on the call treatment parameter and the variable treatment parameter.

2. The method of claim 1, wherein the database associates a plurality of calling party identifiers including the first calling party identifier with the first called party identifier based on a portion of the first calling party identifier provided by the called party.

3. The method of claim 1, wherein the database associates a plurality of identifiers for the called party including the first called party identifier with the first call treatment parameter and the first variable treatment parameter, the first call treatment parameter and the first variable treatment parameter being provided by the called party.

4. The method of claim 1, wherein the variable treatment parameter includes a time restriction.

5. The method of claim 1, further comprising:
   (c) querying the database with the calling party identifier and the called party identifier to obtain a message identifier;
   wherein said treating step (b) includes announcing to the calling party, without connecting the call to the called party, a customized message associated with the message identifier.

6. The method of claim 5, wherein the customized message announced in said treating step (b) is in a selected language, the selected language being selected based on the calling party identifier and the variable treatment parameter.

7. The method of claim 1, wherein said treating step (b) includes terminating the call, without connecting the call to the called party, based on the call treatment parameter and the variable treatment parameter.

8. The method of claim 1, wherein said treating step (b) includes transferring the call to a destination identifier without connecting the call to the called party, based on the call treatment parameter and the variable treatment parameter.

9. The method of claim 1, wherein said treating step (b) includes offering an additional communication service to the calling party based on the call treatment parameter, the variable treatment parameter and the calling party identifier.

10. The method of claim 9, wherein the additional communication service offered to the calling party in said treating step (b) is an operator that can perform language translation, the language translation being based on the calling party identifier and the variable treatment parameter.

11. The method of claim 9, wherein the additional communication service offered to the calling party in said treating step (b) is a messaging service for the calling party to record a second message for the called party.

12. The method of claim 1, wherein the calling party identifier is the automatic number identification (ANI).

13. The method of claim 1, wherein the calling party identifier is the mobile identification number (MIN).

14. The method of claim 1, further comprising:
   (c) receiving from the called party the call treatment parameter, the variable treatment parameter and the message associated with the calling party identifier and the called party identifier.

15. An apparatus for providing customized treatment to incoming calls from a calling party to a called party, within a communications network, comprising:
   a call processing speech module coupled to the communications network; and
   a treatment database coupled to the communications network, a plurality of correlated call treatment parameters and a plurality of variable treatment parameters being stored in said treatment database, each call treatment parameter and each variable treatment parameter being correlated with a calling party identifier and a called party identifier, the variable treatment parameter including an occurrence meter;
   said treatment database receiving a database query with a first calling party identifier and a first called party identifier to obtain a first call treatment parameter from the plurality of call treatment parameters and a first variable treatment parameter from the plurality of variable treatment parameters,
   said call processing speech module, when the first call treatment parameter and the first variable treatment parameter indicates the call requires treatment before being connected, treating the call without connecting the call to the called party.

16. The apparatus of claim 15, wherein the database associates a plurality of calling party identifiers including the first calling party identifier with the first called party identifier based on a portion of the first calling party identifier provided by the called party.

17. The apparatus of claim 15, wherein the database associates a plurality of identifiers for the called party including the first called party identifier with the first call treatment parameter and the first variable treatment parameter, the first call treatment parameter and the first variable treatment parameter being provided by the called party.

18. The apparatus of claim 15, further comprising:
   a message database coupled to the communication network, a plurality of messages being stored in said message database, each message being associated with a message identifier;
   said treatment database storing the plurality of message identifiers, each message identifier being correlated with a calling party identifier and a called party identifier;
   said treatment database receiving a database query with the first calling party identifier, the first variable treatment parameter and the first called party identifier to obtain a first message identifier.

19. The apparatus of claim 15, wherein said call processing speech module announces to the calling party, without connecting the call to the called party, the message associated with the first message identifier.

20. The apparatus of claim 15, wherein said call processing speech module terminates the call without the call being connected to the called party, based on the first call treatment parameter and the first variable treatment parameter.

21. The apparatus of claim 15, wherein said call processing speech module transfers the call to a destination corresponding to a destination identifier without the call being connected to the called party, based on the first call treatment parameter and the first variable treatment parameter.

22. The apparatus of claim 15, wherein said call processing speech module offers an additional communication service to the calling party based on the first call treatment parameter, the first variable treatment parameter and the calling party identifier.

23. The apparatus of claim 15, wherein the treatment offered to the calling party is an operator that can perform language translation, the language translation being based on the calling party identifier.

24. The apparatus of claim 15, wherein the message is in a selected language, the selected language being selected based on the calling party identifier.

25. The apparatus of claim 15, wherein the calling party identifier is the automatic number identification (ANI).

26. The apparatus of claim 15, wherein the calling party identifier is the mobile identification number (MIN).

27. The apparatus of claim 15, further comprising:

a provisioning system connected to the communication network, said provisioning system receiving from the called party the first call treatment parameter, the first variable treatment parameter and the message associated with the first calling party identifier and the first called party identifier, said provisioning system providing the first call treatment parameter and the first variable treatment parameter to said treatment database, said provisioning system providing the message to said message database.

28. An apparatus for providing customized treatment to incoming calls from a calling party to a called party, within a communications network, comprising:

means for receiving a database query with a calling party identifier and a called party identifier to obtain a call treatment parameter and a variable treatment parameter, the variable treatment parameter including an occurrence restriction, means for treating the call without connecting the call to the called party, when the call treatment parameter indicates the call requires treatment before being connected, based on the call treatment parameter and the variable treatment parameter.

* * * * *